United States Patent [19]

Boyd

[11] Patent Number: 4,639,027
[45] Date of Patent: Jan. 27, 1987

[54] THEFT-RESISTANT AUTOMOBILE SIDE COVER

[76] Inventor: David T. Boyd, 94 Stanford, Irvine, Calif. 92715

[21] Appl. No.: 781,046

[22] Filed: Sep. 27, 1985

[51] Int. Cl.[4] .............................................. B60J 11/00
[52] U.S. Cl. .................................... 293/128; 280/770
[58] Field of Search ...................... 296/136; 293/128; 150/52 K, 52 R; 280/770

[56] References Cited

U.S. PATENT DOCUMENTS

| 2,716,433 | 8/1955 | Rawlings | 150/52 K |
| 4,014,583 | 3/1977 | Forbes | 293/128 |
| 4,561,685 | 12/1985 | Fischer | 293/128 |
| 4,571,903 | 2/1986 | Strasser | 293/128 |

Primary Examiner—Robert R. Song
Attorney, Agent, or Firm—Leonard Tachner

[57] ABSTRACT

A protective cover primarily for attachment to the side exterior surface of a vehicle such as an automobile and comprising a substantially rectangular flexible material such as a vinyl fabric to which an elongated strap is affixed for encircling the car door or window thereby rendering the cover resistant to unauthorized removal. Optional lower hooked straps provide means for affixing the bottom edge of the invention to the vehicle door panel and an optional rod contained within an elongated pocket, parallel to the elongated strap, provides added protection of the vehicle surface.

7 Claims, 4 Drawing Figures

THEFT-RESISTANT AUTOMOBILE SIDE COVER

BACKGROUND OF THE INVENTION

1. Field of the Invention

This invention relates generally to protective covers for the exterior of automobiles and more specifically, to a vehicle protective cover which is especially designed to protect the side surfaces of automobiles and which is also designed to be resistant to theft.

2. Prior Art

The general concept of utilizing an exterior surface protective cover to present damage to an automobile, particularly when it is parked next to other vehicles and subject to damage when the doors of the adjacent vehicles are opened carelessly, is old in the art. By way of example, U.S. Pat. No. 1,559,458 to Rizianu issued in 1925 discloses an automobile cover which virtually surrounds the entire vehicle. Other patents of a more pertinent nature include U.S. Pat. No. 4,041,999 to Miller and U.S. Pat. No. 4,531,560 to Balanky. Other patents of a more general interest include U.S. Pat. No. 2,119,072 to Cohen; U.S. Pat. No. 2,803,282 to Wilcox; U.S. Pat. No. 3,298,712 to Greenstadt and U.S. Pat. No. 4,219,218 to Waldon. Although car covers serve many purposes including keeping the car clean, for example, when it is parked outdoors overnight, the present invention is directed to those particular car covers which are designed to protect the exterior of the vehicle, particularly the sides thereof, from inadvertent damage which might otherwise occur when the car is parked adjacent other vehicles such as in a parallel vehicle parking lot wherein those opening the doors of adjacent vehicles might inadvertently cause the door of their vehicle to come in contact with the door of the user's vehicle and thereby damage the paint or dent the wall of the exterior surface or otherwise damage the vehicle. Although there have been many covers disclosed in the prior art which accomplish this purpose, none known to the applicant herein has done so in a configuration designed to be theft-resistant. By way of example, there have been prior art side car covers which utilize magnetic materials to permit attachment of a thick damage-resistant material to the side doors of vehicles by simply adhering magnetically to the vehicle metal exterior. In addition, there has been disclosure in the prior art of a variety of covers which utilize straps to adhere to the exterior of the vehicle by attachment to exterior portions of the vehicle such as the bottom of the car frame and the top of the door frame. In all cases however, these prior art car covers are readily removed without requiring access to the vehicle interior such as by requiring the doors be unlocked and opened. Therefore, there has been a long-felt need for a protective cover for the side exterior of vehicles which in addition to affording the aforementioned protection from adjacent vehicles when the car is parked, are also not readily removable by anyone having access to the exterior of the vehicle alone.

SUMMARY OF THE INVENTION

The present invention comprises an automobile exterior side cover which satisfies the aforementioned long-felt need. More specifically, the protective cover of the present invention accomplishes the objective of prior art automobile side covers by providing a damage-resistant side vehicle cover which may, for example, be fabricated from a vinyl fabric backed with a soft fabric, the latter for protection of the paint finish of the vehicle. Furthermore, the present invention provides a unique elongated strap which is adapted to encircle the car window or car door even when the door and window are closed and locked thereby rendering it necessary to unlock and open the door of the vehicle in order to remove the protective cover.

A particular embodiment disclosed herein also utilizes elastic or draw-straps having suitably positioned hooks and attached to the car cover at the bottom portion thereof for permitting the user to attach the bottom of the cover to the vehicle exterior in a more conventional manner for assuring that the protective cover adheres to the side of the vehicle and is not affected by wind or other disruptive environmental factors. Furthermore, a specific embodiment disclosed herein provides additional protection of the vehicle sides by utilizing a unique elongated pocket at about the mid-line of the protective cover and oriented parallel to the longer access of the cover and at least one and preferably two hard, elongated rods such as PVC pipe which can be readily received and secured within the aforementioned elongated pocket.

Although the aforementioned lower straps and hooks and the aforementioned hard, elongated rods and pockets are not necessary components of the present invention which is not necessarily to be limited thereto, these additional features of the invention are deemed preferable and contribute both to the asthetic appearance of the cover when installed on the vehicle as well as to the effectiveness of the protection afforded by the cover to the vehicle.

OBJECTS OF THE INVENTION

It is therefore a principal object of the present invention to provide a unique theft-resistant vehicle exterior side cover designed to protect the exterior side of a vehicle to which it is connected while renderint the cover substantially resistant to unauthorized removal.

It is an additional object of the present invention to provide a protective cover principally adapted for attachment to the side of a vehicle such as an automobile and which includes attachment means which is designed to encircle the vehicle door or window whereby when the vehicle door and window are closed and locked, the car protective cover is rendered resistant to unauthorized removal.

It is still an additional object of the present invention to provide a unique protective cover for the exterior surface of vehicles and which includes means for substantially adhering the cover to the surface of the vehicle side in conformity therewith while also providing means for rendering the protective cover resistant to theft.

It is still an additional object of the present invention to provide a protective cover for the side exterior surfaces of vehicles and which is theft resistant and which provides additional protection of the vehicle exterior surface over which it is placed by means of at least one elongated hard rod contained within the protective cover at a location designed to be encountered by otherwise damaging structures such as the carelessly opened door of an adjacent vehicle parked parallel to the protected vehicle.

BRIEF DESCRIPTION OF THE DRAWINGS

The aforementioned objects and advantages of the present invention as well as additional objects and advantages thereof will be more fully understood hereinafter in conjunction the following drawings in which.

DETAILED DESCRIPTION OF A PREFERRED EMBODIMENT

Figure 1:
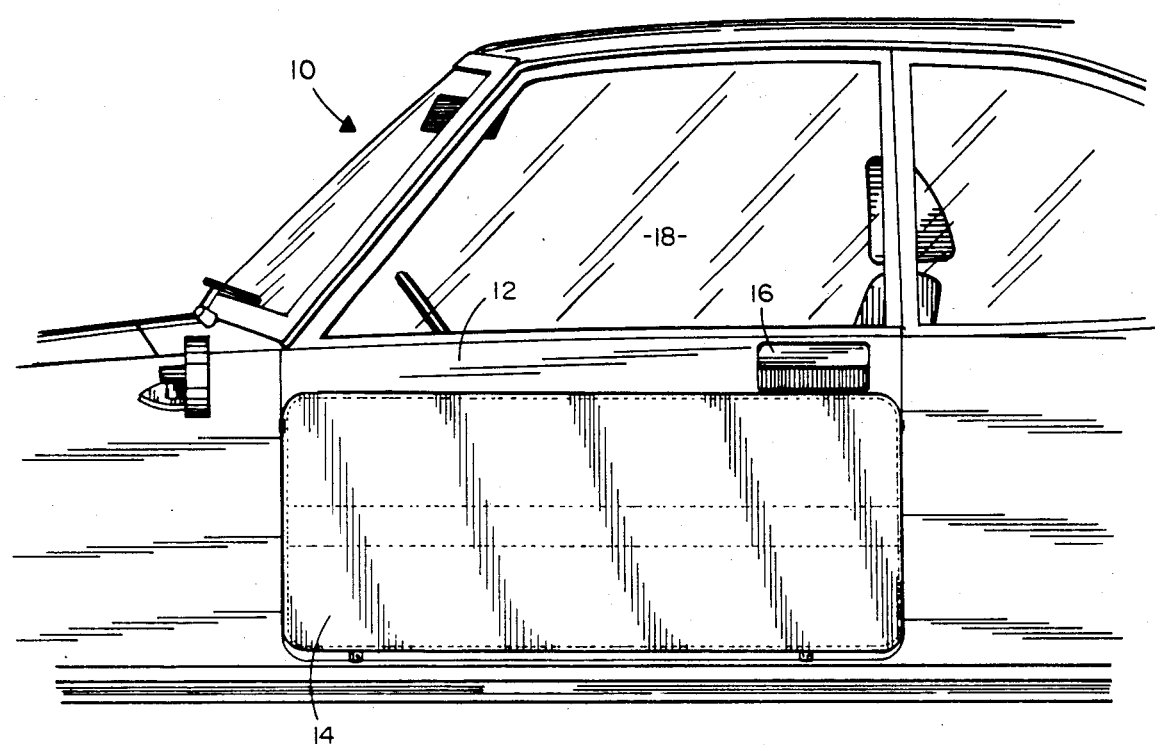
FIG. 1 is a side view of a vehicle on which the protective cover of the present invention is shown installed.
Figure 2:
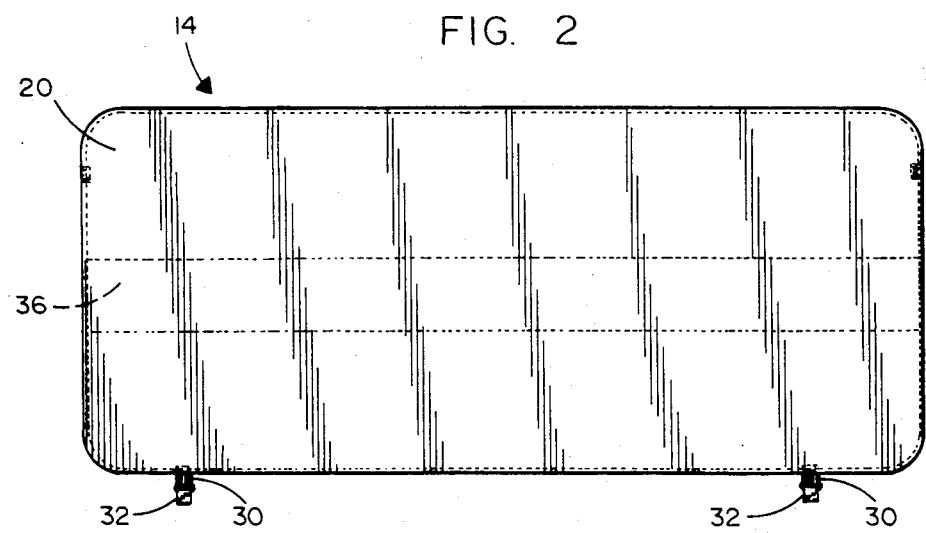
FIG. 2 is a plan view of the exterior surface of the protective cover of the present invention.
Figure 3:
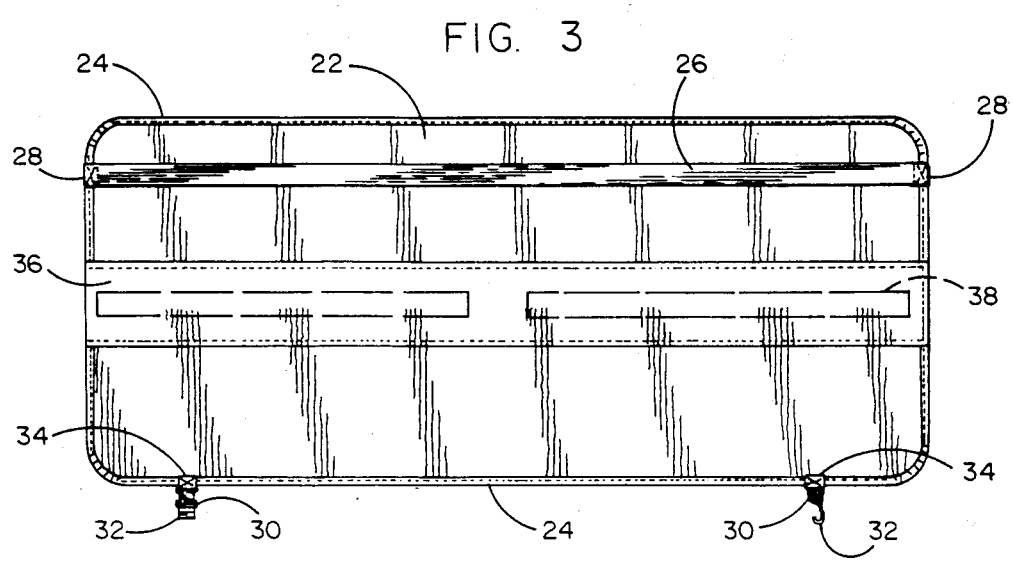
FIG. 3 is a plan view of the interior side surface of the protective cover of the present invention.
Figure 4:
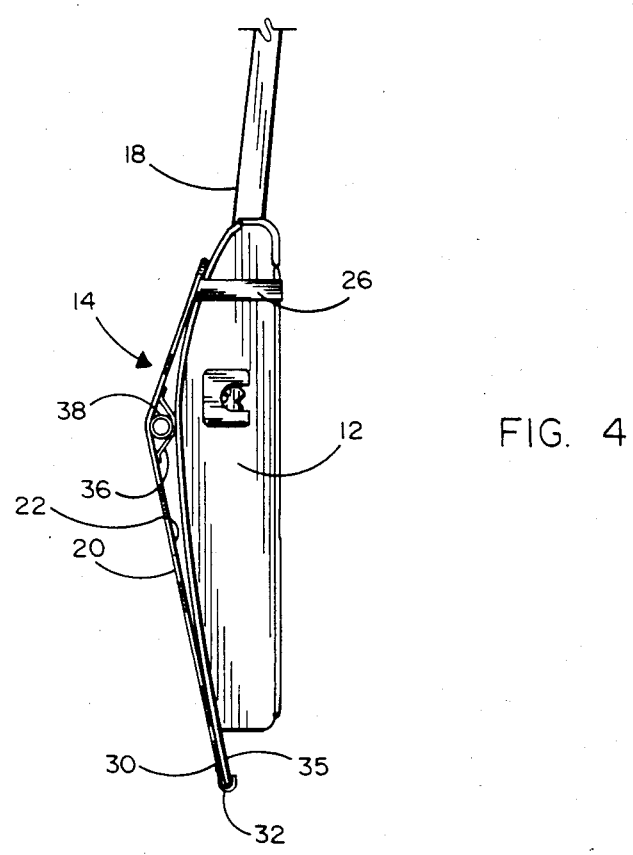
FIG. 4 is an end view of the present invention shown installed on a vehicle and indicating the manner in which the cover may be made theft resistant.

Referring first to FIG. 1 it will be seen that there is shown therein a vehicle 10 of the type having a side door 12 to which the protective cover 14 of the present invention is attached immediately below door handle 16. It will be understood that the position of the protective cover 14 relative to the door handle of the vehicle door is not particularly important in that, in the event the vehicle door handle is covered by the protective cover 14, access to the door handle and associated lock if any, may still be readily provided by merely lifting the cover at its bottom so that access to the door handle may be achieved for opening the door prior to removing the cover. The vehicle 10 is also provided with a side window 18 which normally interacts with the door 12 in a well-known manner. The view provided in FIG. 1 is that of the protective cover of the present invention shown installed on a vehicle in its typical configuration. Reference will now be made to FIGS. 2, 3 and 4 for a more detailed description of the protective cover per se.

As seen in FIGS. 2, 3 and 4, the protective cover 14 of the present invention comprises a substantially rectangular member having an outside surface 20 and an inside surface 22. In one preferred embodiment the outside surface is preferably made of a vinyl-type fabric or any other heavy duty flexible material that would protect the exterior surface of a vehicle such as when hit by the car door edge of an adjacent vehicle and which is also preferably resistant to inclement environmental conditions. The inside surface 22 of protective cover 24 may be of any relatively soft fabric material such as polyester or a combination of polyester and cotton which is sufficiently smooth and soft to avoid abrasive contact with the vehicle surface even when the protective cover is rubbed or moved relative to that surface. The outside surface 20 and inside surface 22 are preferably joined by a hem 24. Hem 24 may be made of folding the outside surface 20 over the inside surface 22 along the edge thereof and by stitching or otherwise affixing the folded portion of outside surface 20 to the remaining edge portion of outside surface 20.

As seen best in FIGS. 3 and 4, protective cover 14 is provided with an elongated retention strap 26 which, in one preferred embodiment, extends the full length of the protective cover in a horizontal direction and is connected to the side hem 24 by suitable attachments 28 such as sewn stitches. Retention strap 26 is preferably placed near the top edge of the protective cover 14, but spaced therefrom so that the retention strap will remain covered by the remaining portions of the protective cover even if there is a bit of sag when the protective cover is installed on the vehicle.

As also shown best in FIGS. 3 and 4, the protective cover 14 also comprises in a preferred embodiment, a pair of flexible straps 30 extending from two spaced, symmetrically located positions at the lower edge of the protective cover in a vertical direction. Each such flexible strap 30 terminates in a hook 32 which is adapted to secure the lower portion of protective cover 14 to the car door as will be hereinafter more fully described. Strap 30 may be made of a commonly available rubber-like ribbon-shaped material which can be readily attached to the lower edge of the protective cover at the hem 24 by means of an attachment 34 which may be, for example, sewn stitching in the same manner that the strap 26 is attached to the remaining portions of the protective cover. It is not necessary that strap 30 be flexible. It may in fact instead be a drawstrap configuration having a buckle which permits adjustment of the length of the strap to accommodate various distances between the edge of the door panel and the lower edge of the protective cover. Hooks 32 are typically of thin, flexible material that may be readily attached to the lower edge of the door panel 35 as seen in FIG. 4 without intefering with closure of the door, it being understood that the straps 30 need not be designed to withstand any substantial tensile load since they are used only for the purpose of keeping the lower portion of the protective cover 14 close to and in conformity with the lower portion of the door 12. In fact, it will be understood herein that the straps 30 and hooks 32 are entirely optional portions of the present invention and should not be deemed to be limiting of the invention scope.

Another optional feature of the preferred embodiment of the invention best seen in FIGS. 3 and 4, comprises an elongated pocket 36 which is adapted to receive at least one and preferably two rods 38. Elongated pocket 36 may be readily formed by employing an additional piece of elongated rectangular soft fabric of the same type used for inside surface 22 such as the previously noted combination of polyester and cotton. It is preferably attached to the remaining portions of protective cover 14 at about the midpoint thereof and parallel to the retention strap 26 such as by means of edge stitching around the perimeter thereof and it may positioned outside of hem 24 as shown in FIG. 3. If preferred, it can alternatively be positioned beneath hem 24 before the hem is stitched in place. In either case, before pocket 36 is entirely enclosed, it receives at least one elongated hard surface rod 38 which may for example, be a length of PVC pipe which is of a hollow or tubular configuration as seen in cross-section in FIG. 4.

The purpose of elongated pocket 36 and rod 38 is to provide additional protection against objects that would be forcefully impacted against the outside surface 20 of the protective cover. Although a unitary rod of any length less than the overall length of the protective cover would be suitable for use in this manner, it has been found advantageous in a preferred embodiment to utilize two such rods, each less than half the length of the protective cover 14 in order to permit folding of the protective cover 14 for storage purposes. It will be understood that the elongated pocket 36 is, in the completed invention, preferably sewn along all sides to the remaining portion of protective cover 14 in order to secure the rods in place and that the view provided in FIG. 4 shows the elongated pocket 36 open only to avoid obvuscation of the rod contained therein in order to better illustrate the structural configuration of the invention. Furthermore, it will be understood that the elongated pocket 36 and rod 38 contained therein, are entirely optional features of the present invention which may perform its protective function in a perfectly acceptable manner without requiring the use of the rods 38 to increase the protective capability thereof. Therefore, the elongated pocket 36 and rod 38 should not be deemed limiting of the scope of the present invention.

Turning now to FIG. 4 it will be observed that the present invention may be installed on the exterior surface of a vehicle by simply placing retention strap 26 over the window 18 of the vehicle so that the combination of the strap 26 and surfaces 20 and 22 form a continuous loop that encircles either window 18 or the uppermost portion of door 12, the latter being shown in FIG. 4 for purpose of illustration. Of course, it will be understood that the ultimate stable position of the protective cover 14 relative to door 12 depends upon the shape and dimensions of the door 12 and window 18. However in any case, the position of the protective cover may if preferred, be controlled by the user by holding it in place while closing door 12 wherein strap 26 will be held in place by the door or window and the adjacent surfaces of the vehicle.

When the protective cover 14 is in place on door 12, it is seen that the outside surface 20 faces the same direction as the exterior of the vehicle and the inside surface 22 is in substantially contiguous engagement with the exterior surface of the door 12, at least along a portion thereof. Furthermore, it will be seen that when straps 30 and hooks 32 are employed as in the preferred embodiment disclosed herein, hooks 32 are preferably attached to the lower surface of the door panel 35 of the door 12 whereby to constrain the lower edge of protective cover 14 against the door surface. Furthermore, it will be seen in FIG. 4 that the rod 38 is positioned within elongated pocket 36 along the exterior of door 12 between the inside surface 22 of the protective cover and the exterior surface of the door. It will be understood that in this configuration rod 38 would tend to provide added protection against damage which might otherwise occur in the event the edge of the door of an adjacent vehicle were opened carelessly and hits the protective cover 14.

It will be understood that the dimensions of the protective cover 14 are not to be limiting of the present invention. However, by way of illustration it is preferable to provide a variety of sizes for the protective cover to accommodate both the front and back doors of different size vehicles. Those having skill in the art to which the present invention pertains will in particular understand that 2-door vehicles tend to have much longer doors than 4-door vehicles. It is presently contemplated that a standard height of 18 inches would provide the necessary protection in a vertical direction for virtually all car doors but that three different length sizes, namely, 30 inches, 36 inches and 42 inches in length would be provided as variations in this particular dimensional parameter to accommodate different door sizes.

Furthermore, it should be understood that the overall length of the protective cover 14 in a horizontal direction as seen in FIG. 1, may be greater than the length of strap 26 whereby the strap would be connected at points inside the edge or hem 24 of the protective cover. This would permit protecting the vehicle exterior side surface beyond the dimensional limits of the door 12.

Furthermore, it should be understood that the distance between the top edge of the protective cover 14 and the strap 26 may also be varied over a substantial range and is not deemed to be limiting of the scope of the invention. Furthermore, although the optional rod 38 is preferably a ¾ inch diameter PVC pipe, other materials and other dimensions of such rods may be substituted therefore. In fact, solid wooden dowels as well as cylindrical rod-like shapes of other materials having different cross-sectional configurations may also be employed for the purpose served by rod 38.

It will now be understood that what had been disclosed herein comprises a novel protective cover that is particularly suitable for the installation on the side doors of vehicles such as automobiles for protecting the exterior surfaces thereof. A principal novel feature of the invention resides in the use of an elongated retention strap which is adapted to encircle the car window or door rendering it necessary to unlock and open the door in order to remove the protective cover thereby making it resistant to theft. A particular preferred embodiment of the invention has been disclosed herein which incorporates certain additional optional features such as lower vertical flexible or adjustable straps which may be used to affix the protective cover at the lower edge thereof to the bottom of the door panel. Furthermore, an additional optional feature of the present invention comprises an elongated pocket adapted to receive at least one and preferably a plurality of elongated rods which extend along a substantial portion of the length of the protective cover for providing additional protection against objects that would otherwise come in contact with the car door or other portions of the side of the vehicle to cause damage thereto.

Those having skill in the art to which the present invention pertains will now, as a result of the teaching herein disclosed, perceive various modifications and additions to the invention. By way of example, variations in shape and materials as well as means for affixing the protective cover to the car door to prevent unauthorized removal thereof will now be contemplated as a result of applicant's disclosure. However, it will be understood that all such modifications and additions are deemed to be within the scope of the invention which is to be limited only by the claims appended hereto.

I claim:

1. An apparatus primarily for attachment to the exterior side surface of a vehicle for protection of such surface against objects that would otherwise come in contact with the vehicle and damage the surface; the apparatus comprising:
   a substantially planar cover of generally flexible material having an interior surface adapted to overlie and remain in substantially contiguous configuration with said vehicle surface; and
   an elongated unitary strap of flexible material attached at its ends to the interior surface of said cover for horizontally encircling a door of said vehicle whereby closure and locking said vehicle door substantially resists unauthorized removal of said cover from said vehicle.

2. The apparatus recited in claim 1 further comprising at least one adjustable strap attached adjacent the lower-most edge of said cover and having means for selective attachment to the lower-most edge of said vehicle door.

3. An apparatus primarily for attachment to the exterior side surface of the vehicle for protection of such surface against objects that would otherwise come in contact with the vehicle and damage the surface; the apparatus comprising:

a substantially planar cover of generally flexible material having an interior surface adapted to overlie and remain in substantially contiguous configuration with said vehicle surface;

an elongated strap of flexible material attached at its ends to the interior surface of said cover for encircling a door of said vehicle whereby closure and locking said vehicle door substantially resists unauthorized removal of said cover from said vehicle, and an elongated rod affixed to said cover in a direction substantially parallel to said elongated strap for further protection of said vehicle.

4. The apparatus recited in claim 3 further comprising a pocket formed in said cover and adapted for receiving said rod.

5. The apparatus recited in claim 1 wherein said cover comprises an outer layer of material and a substantially congruent inner layer of material attached to said outlet layer, said outer layer being of a substance that is resistant to impact by exterior objects, said inner layer being of a substance that is relatively non-abrasive.

6. The apparatus recited in claim 5 wherein said outer layer is vinyl and said inner layer is polyester.

7. The apparatus recited in claim 1 wherein said elongated strap extends substantially the entire length of said cover.

* * * * *